Oct. 16, 1934.  H. A. MANTZ  1,976,953
CONTROL DEVICE
Filed July 1, 1931
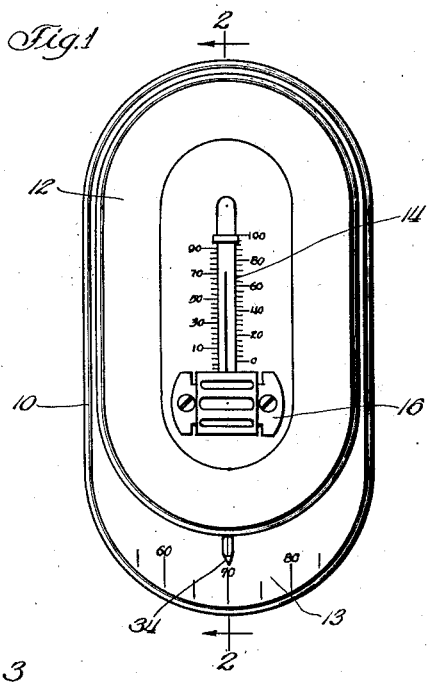
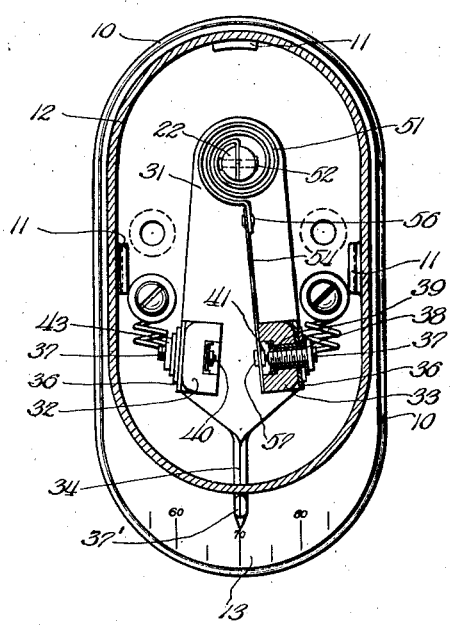
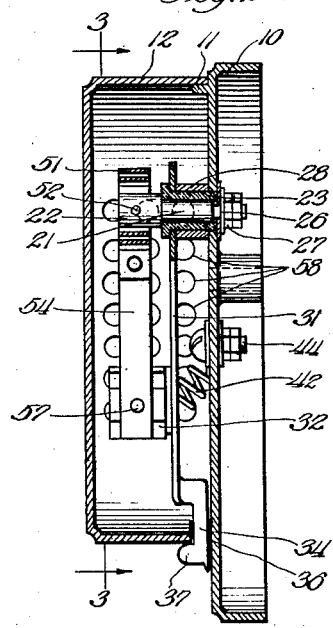
Inventor:
Harold A. Mantz
By Brown, Jackson, Boettcher & Dienner
Attys.

Patented Oct. 16, 1934

1,976,953

UNITED STATES PATENT OFFICE 1,976,953

CONTROL DEVICE

Harold A. Mantz, Milwaukee, Wis., assignor to Milwaukee Gas Specialty Company, Milwaukee, Wis., a corporation of Wisconsin Application July 1, 1931, Serial No. 548,088

13 Claims. (Cl. 200—138)

This invention relates to thermostatic control devices and has particular relation to a snap acting thermostatic control device suitable for controlling a heater or like device for heating a room or other space. It is obvious, however, that the invention, both in method or operation and in structure, may be used or modified for use in a great many other thermostatic control mechanisms.

I have considered the problem of controlling the temperature of a heater or like device for heating a room or other space and have observed that the thermostatic control devices of the prior art are not always satisfactory because of their slowness of action, also because fine adjustments cannot be made and because their action is not positive. The devices of the prior art have not been entirely satisfactory from the standpoint of sensitivity.

I have conceived of means for avoiding these difficulties and have provided a thermostatic control device which will satisfactorily maintain the temperature of the room or other space at certain preselected values without undue wear of, or injury to, the control means. The control device occupies a relatively small space. The device may be used in connection with a two wire circuit such as commonly used in connection with gas and oil heating devices or with a three wire circuit as commonly used in solid fuel heating systems. The device may be adjusted manually to maintain the temperature of a room or other enclosed space at any desired temperature and may be readily used in conjunction with a clock or other control device for securing a predetermined temperature value or a predetermined cycle of temperature values and temperature changes.

It is a general object of the present invention to provide a novel and improved form of thermostatic control device.

More particularly, it is an object of the invention to provide, in a thermostatic control device, a novel means for securing snap action of the moving part or parts of the mechanism, to provide for positive contact of the contacting members and to permit the use of a sensitive thermostatic element.

Another object of the invention is to provide means for quenching the arc when the circuit through the contact points of the device is broken.

Another object of the invention is to provide a device of the above character which may be used with any of the well known types of heating systems and which may be used in conjunction with a clock or other timing device for securing a predetermined temperature value or cycle of temperature values.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims without departing from the spirit of the invention.

In said drawing:—

Figure 1 is a view in front elevation of a device constructed according to my invention;

Figure 2 is a view in vertical section taken substantially along the line 2—2 of Figure 1; and Figure 3 is a view, partly in front elevation and partly in section, taken along the line 3—3 of Figure 2.

The present invention deals particularly with a thermostatic control device of the type wherein a thermostatic element is employed to move a lever or like member between two contacts in response to changes in temperature. The invention is particularly shown and described in an embodiment of such a device adapted to control a heating mechanism to hold the temperature of a room or other enclosed space within certain predetermined limits. It is apparent, however, that the single embodiment of the invention is susceptible to a wide variation in construction for a wide variety of uses.

Referring now to the drawing for a more complete disclosure of this invention there is shown at 10 a hollow, generally oval base having a plurality of upstruck flanges 11 on which a hollow, substantially oval cover 12 may be mounted. The cover is preferably shorter than the base and is mounted thereon in such a manner that a portion of the base is exposed. The exposed portion of the base is then marked with lines and indicia 13 to act as a reference point for setting of the instrument at the temperature at which it is desired the room or other enclosed space should be kept. The exposed faces of the base and cover may be ornamented or decorated in any desired manner. The cover may be provided with a thermometer 14 and thermometer bulb guard 16 as shown in Figure 1.

A shaft 21 having an enlarged, slotted, outer portion 22 is mounted within a suitable opening in the base and is insulated therefrom by means of a collar or bushing 23 of insulating material disposed between the shaft 21 and the wall of the opening in the base, and by means of insulating washers 26. The shaft is engaged in place in the bushing by means of a nut 27 which is threaded on a reduced portion of the shaft. The washers 26 are disposed on the shaft between the nut and the base. The nut 27 bears against the washers, which in turn bear against the inner wall of the base to draw the enlarged portion 22 of the shaft 21 against the collar 23. A larger bushing 28 is disposed over the bushing 23 and is located in a position between the flange at the outer end of the bushing 23 and the outer wall of the base. By drawing up on the nut 27 the enlarged portion 22 of the shaft 21 is drawn against the flange 23 of the bushing which in turn bears against the collar 28.

A magnet carrier 31 is located within the case 12 and is pivotally mounted on the shaft 21 by positioning it on the bushing 23 between the flanged portion of the bushing and the collar 28. It may readily be understood that movement of the carrier about the shaft 21 is restrained because of friction between the carrier and the two bushings and that the degree of restraint may be controlled by drawing up or loosening the nut 27.

The carrier is preferably comprised of a strip or plate of metal of sufficient width to provide a base for mounting two oppositely disposed magnets 32 and 33 near the lower portion thereof and the two sides of the lower end of the plate are bent inwardly and formed to constitute a pointer 34 which projects through a suitable slot 36 in the cover 12 to a position above the indicia 13 on the exposed portion of the base. The pointer 34 is preferably provided with an enlarged portion 37' so that the pointer may be gripped to move it with respect to the base and the indicia.

The magnets are preferably mounted upon the carrier by providing upstruck flanges 36 at the sides of the carrier to which the magnets may be secured by means of the contact screws or studs 37 which are passed through the flanges and threaded into suitable threaded insulating flanged bushings 38, the flanges of which grip the inner wall of the magnets. The contact screws 37 are, in addition, preferably insulated with respect to the magnets and the flanges by means of suitable bushings 39 which are placed over the bushings 38. Electrical connection with the contact points 40 and 41, which are secured to the outer ends of the contact screws 37, is made by means of conductors 42 which are fastened to the screws by means of nuts 43. The conductors are electrically connected to suitable binding posts 44 which pass through, and are insulated from, the base 10. The contact screws 37 are adjustable with relation to the flanges 36 and with respect to the magnets 32 and 33. The magnets may be adjustably located with respect to the flanges by means of washers or the like placed between the magnets and the flanges.

The central portion of the spirally coiled thermostatic element 51 is fastened within the slot in the enlarged end 22 of shaft 21 as by means of a rivet 52 or the like. The outer or free end of the thermostatic or bimetallic element 51 is provided with a radially bent portion to which a spring armature strip 54 is secured as by means of a rivet 56. The outer end of the armature strip is drilled to provide means for securing a pair of contacts 57 thereto. Electrical connection between the binding post 27 and the contacts on the armature strip is made by means of the shaft 21 and the bimetallic element 52.

Openings 58 are provided in the wall of the cover 12 to permit free circulation of air through the instrument in order that the temperature of the thermostat will be the same as the room temperature. The direction of motion of the thermostatic element under changes of temperature depends on the arrangement of the bimetals. In the present instance, the metal of high coefficient of expansion is on the outside and the element coils up on an increase in temperature.

It may readily be understood that coiling and uncoiling of the bimetallic element 52 by reason of changes of the temperature of the air or other media surrounding the bimetallic element, causes magnified movement of the lever 54 between the two extreme positions defined by the magnets 32 and 33. It may readily be understood that the contacts 30 and 33 may be connected electrically to the motor or solenoids of blowers, stokers, valves and the like for controlling heating devices.

In setting the control device, the temperature of the room or other space is preferably brought up to a temperature which is between the maximum and minimum limits of instrument. In the present case, for example, the temperature of 70° would probably be the reference point for setting of the instrument. In the initial setting of the instrument the pointer 34 is moved to a position corresponding to the room temperature as indicated by the thermometer and the nut 27 on shaft 21 is loosened and the shaft moved until the lever 54 occupies a position midway between the two magnets and in line with the pointer.

The instrument is now ready for operation. If the temperature of the room begins to decrease, the lever 54 will move into the influence of the magnet 32 and will be drawn against the magnet to close an electrical circuit to operate a fuel feed valve or other control, a blower or the like to increase the temperature of the room.

If the temperature of the room becomes materially higher than the desired temperature indicated by the pointer, the thermostatic element will cause the lever to move away from the face of the magnet 32 and against the face of the magnet 33 to open the electrical circuit through the contacts 40 and 57 and close an electrical circuit through the contacts 41 and 57 to open or close other electrical circuits which energize or actuate suitable control devices to increase the room temperature.

It may readily be understood that, because the strength of a magnetic field increases inversely as the cube of the distance, movement of the armature occurs with a "snap" action which is quite beneficial and which, among other features, avoids burning and pitting of the contact points. It is quite apparent that the device may be so arranged and adjusted that the armature will snap over against the base of the magnet before the room temperature reaches the value represented by the extreme limit of motion of the armature lever. Since the magnets cause positive electrical connection the thermostatic element need not be thick and heavy to hold the contacts closed and consequently a thin, light and sensitive thermostatic element may be used.

It is apparent that when the device is properly connected in the control circuit of mechanisms for controlling the feeding of fuel to a burner, or to blowers or like devices and the pointer set at a desired temperature a movement of the armature strip by reason of a change in the temperature which affects the bimetallic element will cause movement of the armature strip to control the room temperature.

It may readily be understood that the thermostatic control device operates before any large change in temperature occurs and that the lag between the actual room temperature and the desired temperature is minimized. Corroding and burning of the contact points is greatly reduced because the movement of the armature strip into and out of contact is very rapid. Since any arcs that occur will be within a magnetic field, the arcs will be blown outwardly to extinguish them.

Although I have described a specific embodiment of my invention, it is apparent that the construction of the device may be widely varied to meet a wide range of uses. Such changes may be made without departing from the spirit and scope of my invention as set forth in the appended claims.

I claim as my invention:—

1. In a thermostatic control device, a base, indicia on the base, a cover mounted on the base but so proportioned as to permit reading of the indicia when the cover is in place on the base, a shaft on the base, a carrier mounted for rotation on the shaft and having an indicator arranged to move over the indicia, a pair of magnets fixed in definite spacial relationship upon the carrier, contacts extending through but insulated from said magnets, a thermostatic element having one end thereof secured to the shaft upon which the carrier is rotatably mounted, and an armature strip operatively engaged to the free end of the thermostatic element and arranged for movement in the paths of the magnetic influence of the magnets.

2. In a thermostatic control device, a base, a shaft having an enlarged outer portion mounted on the base, a flanged bushing on the shaft, the flange of which abuts the enlarged portion of the shaft, a carrier pivotally mounted on the flanged bushing, a thermostatic element mounted in the enlarged portion of the shaft, a collar on the bushing between the carrier and the base, and means for drawing the enlarged portion of the shaft toward the base whereby the thermostatic element is adjustably mounted on the base and the carrier is frictionally engaged for movement on the shaft, the degree of frictional engagement thereof being determined by the means for drawing the enlarged portion of the shaft toward the base.

3. In a thermostatic control device, a pair of contacts, a pair of magnets one adjacent to and supporting each said contacts, means for securing said magnets in fixed spacial relationship, and a thermostatic element having an arm movable into and out of engagement with said contacts, said arm constituting an armature for said magnets whereby to produce a snap action of said arm with respect to said magnets, said magnets being movable as a unit to vary the range of snap action of said arm.

4. In a thermostatic control device, a base, a shaft extending through said base, a thermostatic element carried by said shaft, an armature carried by said element, a carrier rotatably mounted upon but insulated from said shaft, opposed magnet means mounted on said carrier, said armature extending between said opposed magnet means, and insulated contacts carried by and extending centrally of said magnet means and engaged by said armature upon variations in temperature.

5. In a thermostatic control device, a base, a shaft extending through said base, a thermostatic element carried by said shaft, an armature carried by said element, a carrier rotatably mounted upon but insulated from said shaft, magnet means mounted in fixed position on said carrier, said armature extending between said magnet means, insulated contacts carried by said magnet means and engaged by said armature upon variations in temperature, and means for shifting said carrier with respect to said armature.

6. In combination, a base, a shaft extending through said base, a thermostatic element mounted on one end of said shaft, an armature carried by said element, a shoulder formed on said shaft, a bushing on said shaft between said shoulder and said base, a carrier mounted on said bushing, a magnet mounted on said carrier, a contact insulated from and extending through said magnet, and means integral with said carrier for moving said magnet with respect to said armature.

7. In a thermostatic control device, a base, a shaft carried thereby, a thermostatic element mounted on said shaft for movement with respect to the base, an armature operatively engaged with the thermostatic element and arranged for movement by the thermostatic element with respect to the base, said armature having a projecting contact, a magnet to cause additional movement of said armature at certain portions of its travel, means pivoted on said shaft for effecting movement of said magnet relative to said base, and contact means threaded centrally through but insulated from said magnet.

8. A thermostat comprising a helically coiled thermally sensitive member, an armature carried by the free end of said member and extending normal to the axis of said member, contact means carried at the extending end of said armature, magnet means disposed on opposite sides of said armature adjacent said contact means, a carrier for retaining said magnets in fixed spacial relationship, integral means for shifting said carrier with respect to said armature, and insulated contacts extending through said magnet means and engaged by said armature contact means.

9. In a device of the class described having an armature responsive to temperature changes, means for varying the range of response of said armature comprising a carrier member pivoted concentrically with said armature, a pair of magnets mounted in fixed position on said carrier member on opposite sides of said armature, and integral means on said carrier member for varying the position thereof with respect to said armature.

10. In a device of the class described having an armature responsive to temperature changes, said armature having contact means adjacent one end thereof, means for varying the range of engagement of said contact means with circuit controlling contacts comprising a carrier member pivoted concentrically with said armature, a pair of magnets disposed in fixed position on said carrier member on opposite sides of said armature, circuit controlling contacts threading through and insulated from said magnets, and integral means on said carrier member for varying its position with respect to said armature.

11. In a device of the class described having a thermostatic element and an armature actuated thereby, mounting means for securing said element in position comprising a shouldered shaft having a split portion for securing said thermostatic element to said shaft, a base member receiving the reduced portion of said shaft, an insulating bushing having a radially flanged portion at one end abutting against the shoulder of said shaft and having abutting engagement against said base member at the other end, means for drawing said shaft shoulder into tight engagement with said bushing, a contact carrier rotatable about said bushing and insulated from said shaft, and a spacing collar disposed about said bushing between said carrier and said base member.

12. In a device of the class described having an armature responsive to temperature changes, means for varying the range of response of said armature comprising a carrier member pivoted concentrically with said armature, a pair of contacts mounted in fixed position on said carrier member and insulated therefrom, said contacts being disposed on opposite sides of said armature, contact means carried at the lower end of said armature for engagement with said contacts upon actuation of said armature, and integral indicating means projecting from said carrier member for varying the position thereof with respect to said armature.

HAROLD A. MANTZ.